US012205157B2

(12) United States Patent
Xie et al.

(10) Patent No.: US 12,205,157 B2
(45) Date of Patent: Jan. 21, 2025

(54) SYSTEM, METHOD, AND NON-TRANSITORY COMPUTER READABLE MEDIUM FOR GENERATING RECOMMENDATIONS

(71) Applicant: Walmart Apollo, LLC, Bentonville, AR (US)

(72) Inventors: Qianwen Xie, Sunnyvale, CA (US); Shirong Xue, Sunnyvale, CA (US); Behnoush Abdollahi, Sunnyvale, CA (US); Rahul D. Sharnagat, Sunnyvale, CA (US); Lili Yuan, San Jose, CA (US); Min Xie, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 28 days.

(21) Appl. No.: 17/163,378

(22) Filed: Jan. 30, 2021

(65) Prior Publication Data

US 2022/0245704 A1    Aug. 4, 2022

(51) Int. Cl.
*G06Q 30/0601* (2023.01)
*G06F 16/9535* (2019.01)
*G06F 16/9538* (2019.01)

(52) U.S. Cl.
CPC ..... *G06Q 30/0631* (2013.01); *G06F 16/9535* (2019.01); *G06F 16/9538* (2019.01);
(Continued)

(58) Field of Classification Search
CPC .......... G06Q 30/0631; G06Q 30/0627; G06Q 30/0629; G06Q 30/0643; G06F 16/9535; G06F 16/9538
See application file for complete search history.

(56) References Cited

U.S. PATENT DOCUMENTS 8,538,836 B1 * 9/2013 Scott .................. G06Q 30/0603
705/27.2
8,688,732 B1 * 4/2014 Rajyaguru ......... G06Q 30/0278
707/776

(Continued)

OTHER PUBLICATIONS

Lee, J., Jung, O., Lee, Y., Kim, O., & Park, C. (2021). A comparison and interpretation of machine learning algorithm for the prediction of online purchase conversion. Journal of Theoretical and Applied Electronic Commerce Research, 16(5), 1472. doi:http://dx.doi.org/10.3390/jtaer16050083 (Year: 2021).*

(Continued)

*Primary Examiner* — Jeffrey A. Smith
*Assistant Examiner* — Ashley D Preston
(74) *Attorney, Agent, or Firm* — Morgan, Lewis & Bockius LLP; Manita Rawat

(57) ABSTRACT

This application relates to apparatus and methods for providing recommended items based on a search request. In some examples, a computing device determines a plurality of items for recommendation based on an item type in the search request from a user. The computing device then determines a model variant from a plurality of variants for each item based on a requested variant in the search request. The computing device generates item recommendations by modifying an item title for each of the plurality of items to indicate the corresponding model variant. The computing device then presents the item recommendations for the user's perusal.

17 Claims, 6 Drawing Sheets

(52) U.S. Cl.
CPC ..... *G06Q 30/0627* (2013.01); *G06Q 30/0629* (2013.01); *G06Q 30/0643* (2013.01)

(56) References Cited

U.S. PATENT DOCUMENTS

| | | | | |
|---|---|---|---|---|
| 10,706,450 | B1* | 7/2020 | Tavernier | G06Q 30/0625 |
| 10,878,473 | B1* | 12/2020 | Thekkanal | G06Q 30/0641 |
| 11,151,608 | B1* | 10/2021 | Guo | G06Q 30/0255 |
| 2015/0310526 | A1* | 10/2015 | Warren | G06F 16/951 |
| | | | | 705/26.62 |
| 2015/0379117 | A1* | 12/2015 | Kalinin | G16B 40/00 |
| | | | | 707/737 |
| 2016/0055563 | A1 | 2/2016 | Grandhi | |
| 2019/0079925 | A1* | 3/2019 | Wang | G06F 40/279 |
| 2019/0244094 | A1* | 8/2019 | Ramsl | G06N 3/02 |
| 2020/0111022 | A1* | 4/2020 | Silberman | G06N 3/044 |
| 2020/0242181 | A1* | 7/2020 | Mueller | G06F 16/2425 |
| 2020/0311158 | A1* | 10/2020 | Huet | G06Q 30/0623 |
| 2021/0118031 | A1* | 4/2021 | Beaver, III | G06Q 50/04 |
| 2021/0258502 | A1* | 8/2021 | Timonen | H04N 7/18 |
| 2021/0406978 | A1* | 12/2021 | Subramanian | G06N 3/08 |

OTHER PUBLICATIONS

Fries, "Amazon A9—Amazon's ranking algorithm explained", 2020, p. 1-11.
Feedvisor, "How Does Amazon's A9 Search Engine Work?", 2021, p. 1-13.
Ringaudas, "18 Ecommerce Site Search Best Practices For 2021", 2020, p. 1-15.
Xsellco, "How to Optimize Your Listings for eBay Best Match", 2020, p. 1-14.

* cited by examiner

SYSTEM, METHOD, AND NON-TRANSITORY COMPUTER READABLE MEDIUM FOR GENERATING RECOMMENDATIONS

TECHNICAL FIELD

The disclosure relates generally to digital item recommendations and, more specifically, to electronically generating item recommendations that are based on search queries including item attributes.

BACKGROUND

At least some websites, such as retailer websites, display item recommendations (e.g., search results) to customers based on search queries. For example, the website may provide item recommendations or advertisements for the customer to view on the website's homepage. The item recommendations may include an item title, an image of an item, and a price of the item, for example. The website may further allow the customer to purchase the recommended items. In some examples, search systems may generate the item recommendations based on algorithms, such as machine learning algorithms, that operate on item data. The algorithms may present the item recommendations to the customer with previously stored item information. In some examples, the displayed item information such as title, image, etc. are selected in a random default way from item data. In such examples, the customer is required to click on the displayed item to see additional details to determine whether the item includes a search variant (e.g., required size, required quantity, etc.).

However, the item recommendation may not be relevant to the customer visiting the website. For example, the recommended item may not be available in the search variant that the customer is looking for as the customer may visit the website with an intent to shop for one variant of the product, but may not find out that the variant is unavailable for the particular item recommendation till clicking on the item and parsing additional information about the item. Because the customer may not be interested in the available variants of the item, the customer may decide not to purchase the recommended item. As a result, a retailer may lose out on sales of items to a customer. For example, the customer may leave the website without having purchased an item that, if shown as a recommendation along with the variant, the customer would have purchased. In some examples, if a customer perceives an item recommendation as irrelevant, the customer may get frustrated and go elsewhere, such as another website, to purchase an item that is easily searchable. As such, there are opportunities to improve the determination and generation of item recommendations that present item information, including searched variant information, in an easy to consume manner.

SUMMARY

The embodiments described herein are directed to automatically generating item recommendations (e.g., search results) for search requests that may be displayed, for example, on a website. The embodiments may allow a person, such as a customer, to be presented with recommendations of items (e.g., products and services) with relevant variants on the recommendation page in response to a search query.

In various embodiments, a system including a memory having instructions stored thereon and a processor is disclosed. The processor is configured to read the instructions to receive a search request including an item type and a requested variant. The processor further obtains a plurality of items from a database based on the item type. The processor also determines a plurality of model variants for the plurality of items such that each model variant corresponds to a different item. Each model variant is determined at least in part from a list of variants and based on the requested variant. Further, the processor modifies an item title for each of the plurality of items to include the corresponding model variant. The processor generates a plurality of item recommendations using the modification of the item title for each of the plurality of items. The processor also presents the item recommendations to the customer via a user interface.

In various embodiments, a non-transitory computer-readable medium having instructions stored thereon is disclosed. The instructions, when executed by a processor cause a device to perform operations including receiving a search request including an item type and a requested variant. The operations further include obtaining a plurality of items from a database based on the item type. Further, the operations include determining a plurality of model variants for the plurality of items such that each model variant corresponds to a different item. Each model variant is determined at least in part from a list of variants and based on the requested variant. The operations also include modifying an item title for each of the plurality of items to include the corresponding model variant. Further, the operations include generating a plurality of item recommendations using the modification of the item title for each of the plurality of items. The operations also include presenting the item recommendations to the customer via a user interface.

In various embodiments, a method of generating item recommendation based on a search request is disclosed. The method includes receiving a search request including an item type and a requested variant. The method further includes obtaining a plurality of items from a database based on the item type. Further, the method includes determining a plurality of model variants for the plurality of items such that each model variant corresponds to a different item. Each model variant is determined at least in part from a list of variants and based on the requested variant. The method also includes modifying an item title for each of the plurality of items to include the corresponding model variant. The method includes generating a plurality of item recommendations using the modification of the item title for each of the plurality of items. Additionally, the method includes presenting the item recommendations to the customer via a user interface.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
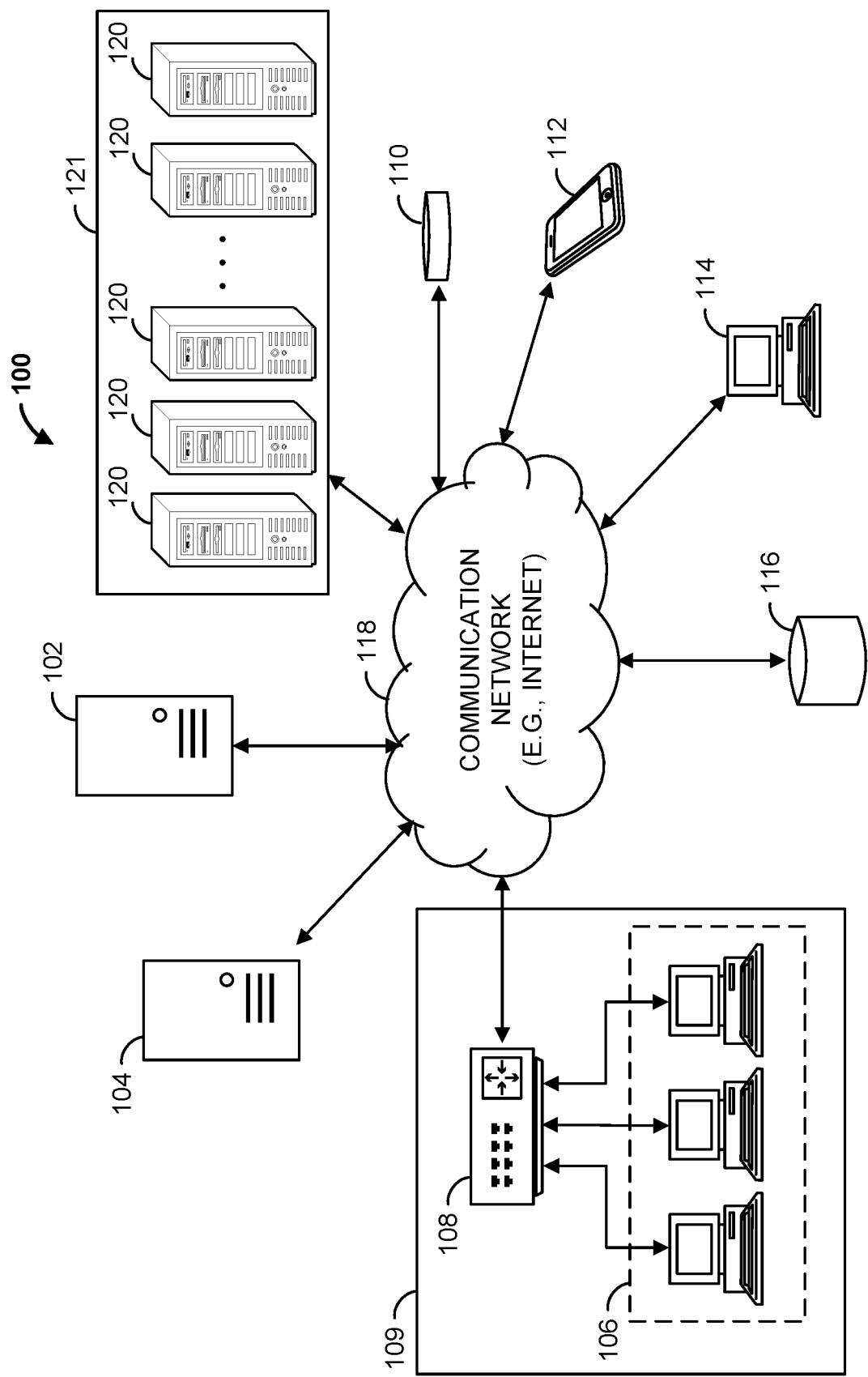
FIG. 1 is a block diagram of an item recommendation system that includes an item recommendation computing device in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an item recommendation system 100 that includes an item recommendation computing device 102 (e.g., a server, such as an application server), a web server 104, one or more processing devices 120, workstation(s) 106, database 116, and one or more customer computing devices 110, 112, 114 operatively coupled over network 118. Item recommendation computing device 102, web server 104, workstation(s) 106, processing device(s) 120, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over communication network 118.

In some examples, each of item recommendation computing device 102 and processing device(s) 120 can be a computer, a workstation, a laptop, a server such as a cloud-based server, or any other suitable device. In some examples, each of processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of one or more processing devices 120 are offered as a cloud-based service (e.g., cloud computing). For example, cloud-based network 121 may offer computing and storage resources of one or more processing devices 120 to item recommendation computing device 102.

In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, web server 104 hosts one or more retailer websites. In some examples, item recommendation computing device 102, processing devices 120, and/or web server 104 are operated by a retailer, and multiple customer computing devices 112, 114 are operated by customers of the retailer. In some examples, processing devices 120 are operated by a third party (e.g., a cloud-computing provider).

Workstation(s) 106 are operably coupled to communication network 118 via router (or switch) 108. Workstation(s) 106 and/or router 108 may be located at a store 109, for example. Workstation(s) 106 can communicate with item recommendation computing device 102 over communication network 118. The workstation(s) 106 may send data to, and receive data from, item recommendation computing device 102. For example, the workstation(s) 106 may transmit data identifying search request provided by a customer at store 109 to item recommendation computing device 102.

Although FIG. 1 illustrates three customer computing devices 110, 112, 114, item recommendation system 100 can include any number of customer computing devices 110, 112, 114. Similarly, item recommendation system 100 can include any number of item recommendation computing devices 102, processing devices 120, workstations 106, web servers 104, and databases 116. Customer computing devices 110, 112, 114, may be configured to send search requests to item recommendation computing device 102, and in response, receive item recommendations for presentation from the item recommendation computing device 102.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, each of multiple computing devices 110, 112, 114 may be operable to view, access, and interact with a website, such as a retailer's website, hosted by web server 104. Web server 104 may transmit search requests submitted by the customers on the website. For example, a customer may operate one of customer computing devices 110, 112, 114 to initiate a web browser that is directed to the website hosted by web server 104. The customer may, via the web browser, send a search request via a user interface on the website, and may click on item recommendations, for example. The website may capture the search request, and transmit the user search request to item recommendation computing device 102 over communication network 118. The website may also allow the operator to add one or more of the items to an online shopping cart, and allow the customer to perform a "checkout" of the shopping cart to purchase the items. In some examples, web server 104 transmits purchase data identifying items the customer has purchased from the website to item recommendation computing device 102.

In some examples, item recommendation computing device 102 may execute one or more models (e.g., algorithms), such as a machine learning model, statistical model, algorithm, etc., to determine recommended items to advertise to the customer (i.e., item recommendations) based on the search request (e.g., search query). Item recommendation computing device 102 may transmit the item recommendations to web server 104 over communication network 118, and web server 104 may display recommendations (e.g., descriptions, links) for one or more of the recommended items on the website to the customer. For example, web server 104 may display the item recommendations to the customer on a homepage, a catalog webpage, an item webpage, or a search results webpage of the website (e.g., as the customer browses those respective webpages).

In some examples, web server 104 transmits a search request to item recommendation computing device 102. The search request may identify a search query provided by the customer (e.g., via a search bar of the web browser). In response to receiving the request, item recommendation computing device 102 may execute the one or more processors to determine search results to display to the customer (i.e., item recommendations). Item recommendation computing device 102 may transmit search results to web server 104 over communication network 118. Web server 104 may display the search results on a search results webpage, for example.

Item recommendation computing device 102 is further operable to communicate with database 116 over communication network 118. For example, item recommendation computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to item recommendation computing device 102, in some examples, database 116 can be a local storage device, such as a hard drive, a non-volatile memory, or a USB stick. Item recommendation computing device 102 may store item data in database 116.

In some examples, item recommendation computing device 102 generates feature vectors for a plurality of models (e.g., machine learning models, statistical models, algorithms, etc.) based on search requests, and item data for all items available in the database 116. Item recommendation computing device 102 trains the models based on their corresponding feature vectors, and item recommendation computing device 102 stores the models in a database, such as in database 116 (e.g., cloud storage).

The models, when executed by item recommendation computing device 102, allow item recommendation computing device 102 to determine item recommendations for one or more items to advertise to a customer. For example, item recommendation computing device 102 may obtain the models from database 116. Item recommendation computing device 102 may then receive, in real-time from web server 104, a search request from the customer interacting with a website (e.g., during a browsing session). In response to receiving the search request, item recommendation computing device 102 may execute the models to determine item recommendations for items to display to the customer.

In some examples, item recommendation computing device 102 receives a search request (e.g., search query) from web server 104. The search query may identify customer intent for item recommendations. The search request may include an item type (e.g., mattress, wooden slab, diaper, etc.) and a requested variant(s) (e.g., specific size, specific color, etc.) for an attribute(s) (e.g., size, length, width, color, etc.). In some examples, the search query may be parsed and analyzed to determine an intended or requested variant. Any known language model may be used to analyze the search request to determine a customer intent, including a requested variant(s) and item type. For example, from a search request "diaper 6," item recommendation computing device may determine that customer intent to be "size 6 diaper," with "diaper" being the item type, "size" being the attribute, and "6" being the variant of the "size" attribute. As another example, search request "white full sheet" may be interpreted as "sheet" being the item type, "white" being a first variant for a first attribute "color," and "full" being a second variant for a second attribute "size." A language model may be used to determine or interpret the intent of the customer based on the search query. Even though the examples herein describe the attributes as being color and size, it should be understood that any other attributes corresponding to items may also be used.

In some examples, item type may be used to determine a plurality of items for analysis from database 116. For example, database 116 may include item data for all items available for purchase from the retailer. Each item in database 116 may include item type, item name, item category, item attributes and corresponding variants, item price(s), item images, item description, item identifier, etc. In some examples, each item variant may be associated with an item image and/or an item price. Based on the item type in the search request, a plurality of items may be selected from the database 116 such that each of the items in the plurality of items correspond to the item type.

In examples where there are multiple attributes identified in the search request, item recommendation computing device 102 may determine a priority for each of the attributes requested in the search request. In some examples, a priority list of all possible attributes may be stored in database 116. Item recommendation computing device 102 may obtain the priority list from the database 116 and compare the priority list to the requested attributes to determine a priority for each of the requested attributes. The priority list may have pre-determined, ranked attributes. In some other examples, item recommendation computing device 102 may use a pre-trained model to determine a priority for each requested attribute. In another example, the requested attributes may be assigned priorities randomly. For example, "color" attribute may be ranked higher than "size attribute," or vice a versa. Based on the priority, the highest priority attribute may be used to further parse the plurality of items to determine item recommendations. In some examples, the item recommendations may be determined in a multi-step process, where the items at each step, items are analyzed to determine best matches based on attribute priority. For examples, items chosen based on first attribute and its corresponding variant may be further culled based on second attribute and its corresponding variant. In other examples, only the highest priority attribute may be used to generate item recommendations.

In some examples, item recommendation computing device 102 may determine a list of all possible variants for a requested attribute based on the plurality of items. For each item in the plurality of items, a list of all variants for the requested attribute may be collected. For example, for a search request, "diaper 6," all diapers available at the retailer may be determined as plurality of items. For each diaper, all variants of size may be collected as a list of diaper sizes.

In some examples, item recommendation computing device 102 may utilize a matching algorithm to determine a model variant for each item of the plurality of items based on the corresponding list of variants and the requested variant. The matching algorithm may take as input the plurality of items, their corresponding list of variants, the requested variant, and the request item type. For each item of the plurality of items, item recommendation computing device 102 may select a model variant from the list of variants based on the requested variant.

An attribute may include single-dimension variants, multi-dimensional variants, and/or categorical variants. For example, a size attribute for a diaper may include single-dimensional variants, such as sizes 1, 2, 3, 4, etc. Similarly, a size attribute for a wooden slab may include two-dimensional variants, such as sizes 6×10, 10×12, 5×8, etc. A size attribute for a mattress may include categorical variants, such as queen, king, double, single, etc. Although, single-dimensional, two-dimensional, and categorical variants are described herein, it should be understood that all other possible type of variants may similarly be used.

In some examples, when the list of variants for an item includes single-dimensional variants, matching algorithm may find the model variant corresponding to the requested attribute by comparing the requested variant to each of the variants in the list of variants. In some examples, item recommendation computing device 102 may rank each of the variants in the list of variants based on the closeness of the variant to the requested variant. The top ranked variant for the item may then be used as the model variant. For example, for a search request, "diaper 6," and a "first diaper" with the list of variants including sizes 1, 2, 3, 4, 5, 6, 7, and 8, size "6" may be determined to the model variant based on size "6" being a closest match to the requested variant "6."

In examples where the list of variants for an item includes two-dimensional variants, matching algorithm may find the model variant corresponding to the requested attribute by comparing the requested variant (e.g., two-dimensional variant) to each of the variants in the list of variants. For example, for a requested variant, "6×10," matching algorithm may compare each variant in the list of variants to "6×10," and "10×6." Both dimensions of the variants may be compared to both dimensions of the requested variant. The closest variant to the requested variant may then be determined to be the model variant for that item. It should also be understood that for a requested variant that is single-dimensional, with industry standards (e.g., in the item information) corresponding to two-dimensions, the information for the item may be used to find the closes match, and vice a versa. For example, a size 2 cutting board may be associated by a size 3×4 in the item description. In other examples, each item attribute may also be associated with variants of different types in the database 116. For example, a cutting board's attribute "size" may include single-dimensional variants and corresponding two-dimensional variants. In such examples, item recommendation computing device 102 may compare a two-dimensional requested variant with two-dimensional variants of the item, and a single-dimensional requested variant with single-dimensional variants of the items in the list.

In other examples, when the list of variants for an item includes categorical variants, matching algorithm may find the model variant corresponding to the requested attribute by comparing the requested variant to each of the variants in the list of variants. In some examples, item recommendation computing device 102 may rank each of the variants in the list of variants based on the closeness of the variant to the requested variant. The top ranked variant for the item may then be used as the model variant. For example, for a search request, "queen mattress," and a "first mattress" with the list of variants including sizes king, queen, twin, and single, size "queen" may be determined to the model variant based on size "queen" being a closest match to the requested variant "queen." It should also be understood that for a requested variant that is categorical, with industry standards (e.g., in the item information) corresponding to two-dimensions and/or one dimension, the information for the item may be used to find the closes match, and vice a versa. For example, a size queen mattress may be associated by 80 inches×66 inches in the item description. In other examples, each item attribute may also be associated with variants of different types in the database 116. For example, a mattresses attribute "size" may include two-dimensional variants and corresponding categorical variants. In such examples, item recommendation computing device 102 may compare a two-dimensional requested variant with two-dimensional variants of the item, and a categorical requested variant with categorical variants of the items in the list.

In some examples, the plurality of items may be culled to determine a subset of items based on the requested variant for the requested attribute being in the plurality of items prior to applying the matching algorithm. The subset of items may then include items including the requested variant. Each item of the subset of items may then be provided to the matching algorithm to select a model variant amongst the corresponding list of variants.

In some examples, if the model variant is unavailable (e.g., out of stock) at the retailer, the next variant on the list may be selected as the model variant. In some other examples, the out of stock variants are removed from the list of variants for the item prior to applying the matching algorithm. In this way, the customer is not presented with an item that the customer cannot buy, thus, reducing potential customer frustration. For each item of the plurality of items (or set of items), similar analysis may be done to find a model variant for the next attribute in the priority list.

Item recommendation computing device 102 may then generate item recommendations based on the plurality of items (or the set of items) and their corresponding model variants. For each item in the plurality of items, item recommendation computing device may utilize a swapping algorithm to modify (e.g., swap) at least a portion of the item title with the model variant. For example, an item with original title "Pamper's Choice Diapers (Choose Size & Count) may be modified as "Pamper's Choice Diaper, Size 3, 36 Diapers) based on the model variant for attribute "size" being "3" and/or the model variant for attribute "count" being 36. In some examples, an image associated with the item may also be swapped with an image corresponding to the model variant(s). In some examples, price associated with the time may also be swapped with a price associated with the model variant(s) of the item.

Item recommendation computing device 102 may then present the item recommendations with the modified item titles, images, and/or prices to the customer via the customer computing device 112. In this way, item recommendation computing device 102 may be configured to improve user search experience by selecting and providing the model (e.g., best) matching item variant for a search query in the search results such that the user may not need to click on each recommendation to find the relevant variants.

Figure 2:
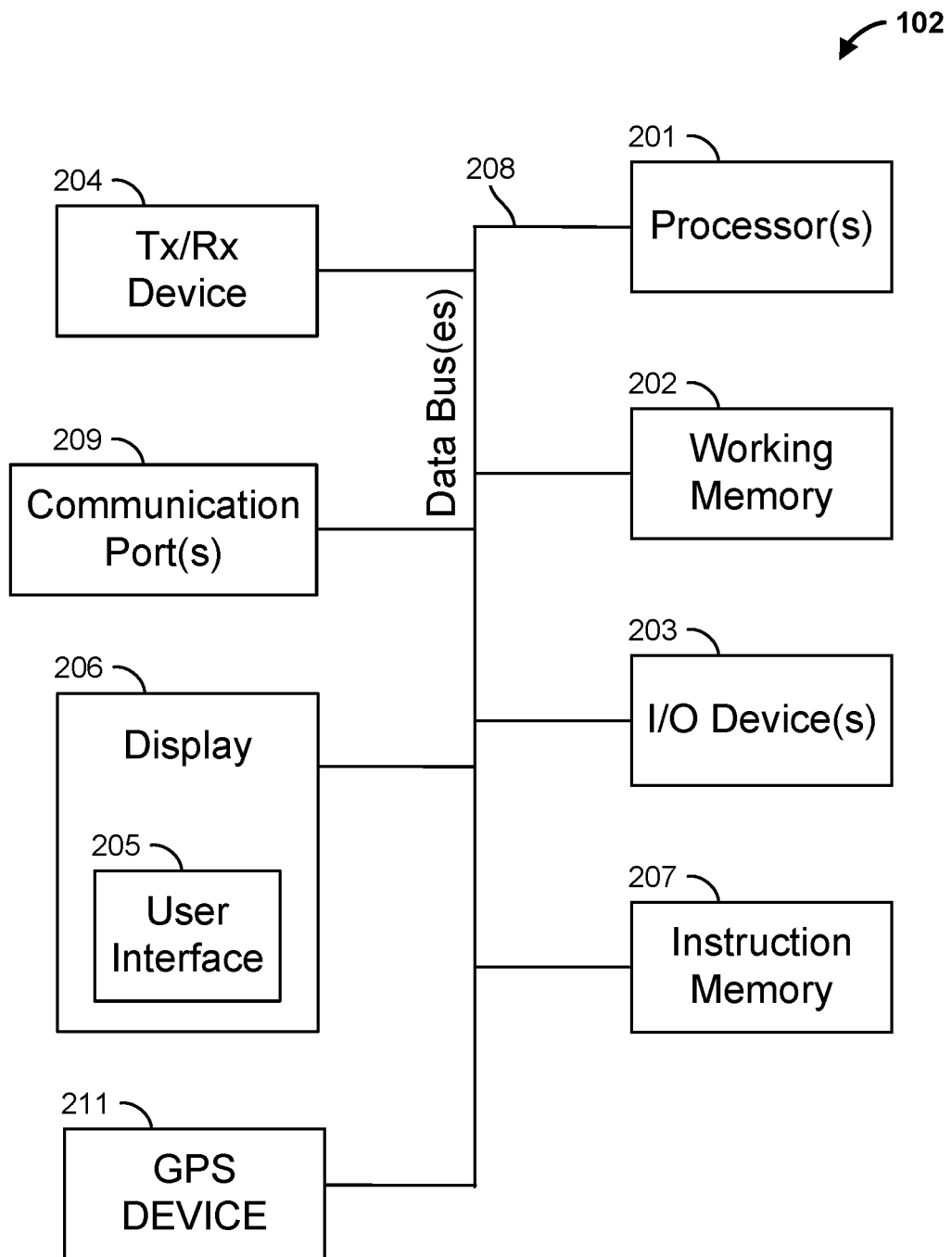
FIG. 2 is a block diagram of the item recommendation computing device of FIG. 1 in accordance with some embodiments.

FIG. 2 illustrates the item recommendation computing device 102 of FIG. 1. Item recommendation computing device 102 can include one or more processors 201, working memory 202, one or more input/output devices 203, instruction memory 207, a transceiver 204, one or more communication ports 209, a display 206 with a user interface 205, and a global positioning system (GPS) device 211, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 201 can be configured to perform a certain function or operation by executing code, stored on instruction memory 207, embodying the function or operation. For example, processors 201 can be configured to execute code stored in instruction memory 207 to perform one or more of any function, method, or operation disclosed herein.

Additionally, processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of item recommendation computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning model training data.

Display 206 can be any suitable display, and may display user interface 205. User interfaces 205 can enable user interaction with item recommendation computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 item recommendation computing device 102 will be operating in. Processor(s) 201 is operable to receive data from, or send data to, a network, such as communication network 118 of FIG. 1, via transceiver 204.

GPS device 211 may be communicatively coupled to the GPS and operable to receive position data from the GPS. For example, GPS device 211 may receive position data identifying a latitude, and longitude, from a satellite of the GPS. Based on the position data, item recommendation computing device 102 may determine a local geographical area (e.g., town, city, state, etc.) of its position. Based on the geographical area, item recommendation computing device 102 may determine relevant trend data (e.g., trend data identifying events in the geographical area).

Figure 3:
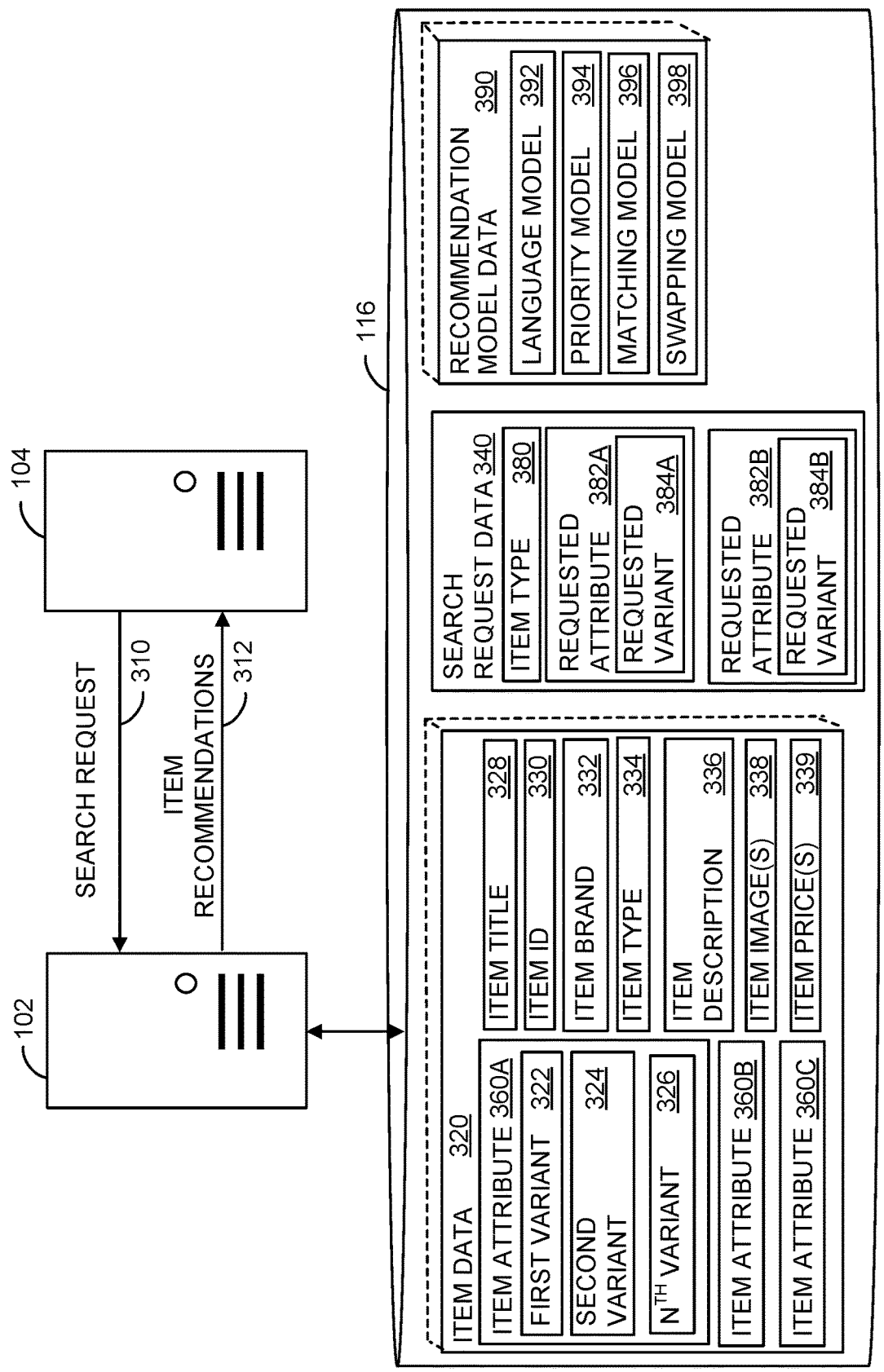
FIG. 3 is a block diagram illustrating various portions of the item recommendation system of FIG. 1 in accordance with some embodiments.

FIG. 3 is a block diagram illustrating examples of various portions of the item recommendation system 100 of FIG. 1. As indicated in the figure, item recommendation computing device 102 may receive search request 310 from web server 104, and store the search request 310 as parsed search request data 340 in database 116. Search request 310 may identify an item type, one or more attributes and their corresponding requested variants. Item recommendation computing device 102 may use language model 390 to parse the search request 310 to determine a user intent, including item type 380, requested attribute 382A, its corresponding requested variant 384A, requested attribute 382B, and its corresponding requested variant 384B and so on, and store it in database 116 as search request data 340.

In this example, search query data 340 may include item type 380 identifying a type or category of item requested by the user in the search request, requested attribute 382A identifying an attribute (e.g., size, color, count) that is important to the user, requested variant 384A identifying a variant (e.g., size 6, size 8, queen size, 7×4 size) for the requested attribute 382A, requested attribute 382B identifying another attribute of the item type and requested variant 384B associated with the requested attribute 382B.

Search request data 340 may identify one or more searches conducted by a user during a browsing session (e.g., a current browsing session). For example, item recommendation computing device 102 may receive a search request 310 from web server 104, where the search request 310 identifies one or more search terms provided by the user. Item recommendation computing device 102 may store the search terms (e.g., item type, requested attribute(s), requested variant(s) as provided by the user as search request data 340 after parsing the search request 310 using language model 392.

Database 116 may further store item data 320, which may identify one or more attributes of a plurality of items, such as a portion of or all items a retailer carries. Item data 320 may identify, for each of the plurality of items, an item title 328 (e.g., product name to presented to user as a title for the item), item ID 330 (e.g., an SKU number), item brand 332, item type 373 (e.g., grocery item such as milk, clothing item, mattress, diaper), item description 336 (e.g., a description of the product including product features, such as ingredients, benefits, use or consumption instructions, or any other suitable description), item image(s) 338 (e.g., images associated with different variations of the item) and item price(s)

339 (e.g., prices or price range associated with the different variations (e.g., sizes, colors, flavors, etc.)) of the item. Item data 320 may also include, for each of the plurality of items, item attribute 360A (e.g., size) associated with a list of variants including first variant 322, second variant 324, . . . , and $N^{th}$ variant 326 (e.g., all size variations available for the item). Item data 320 may further include, for each item, item attribute 360B, item attribute 360C, and so on, each including a list of variants available for the item.

Database 116 may also store recommendation model data 390 identifying and characterizing one or more models. For example, recommendation model data 390 may include a language model 392, a priority model 394, a matching model 396, and a swapping model 398. Each of the language model 392, priority model 394, matching model 396, and swapping model 398 may be machine learning models trained based on corresponding tensors (e.g., embedding vectors, feature vectors) generated by item recommendation computing device 102.

In some examples, item recommendation computing device 102 receives (e.g., in real-time) search request 310 for a customer interacting with a website hosted by web server 104. In response, item recommendation computing device 102 generates item recommendation 312 identifying recommended items to advertise to the customer, and transmits item recommendation 312 to web server 104.

For example, item recommendation computing device 102 may assign each of the language model 392, priority model 394, matching model 396, and swapping model 398 (or parts thereof) to a different processing unit or virtual machines hosted by one or more processing devices 120. Moreover, item recommendation computing device 102 may generate tensors based at least on the received search request data 340 (e.g., the parsed search request 310) for the customer and the item data 320 (e.g., the data available for each item sold by retailer), as required by each of the language model 392, priority model 394, matching model 396, and swapping model 398. In some examples, item recommendation computing device 102 generates the tensors based on the received, for each of the language model 392, priority model 394, matching model 396, and swapping model 398. Item recommendation computing device 102 may provide (e.g., transmit) the tensors to the processing units accordingly, and the processing units may execute the models based on the provided tensors (e.g., inferencing).

Further, item recommendation computing device 102 may obtain the output (e.g., output data, output tensors) of each of the language model 392, priority model 394, matching model 396, and swapping model 398 from the processing units, and generate the item recommendation 312 based on the outputs of the models. For example, item recommendation computing device 102 may use results of one model to generate output of the next model and so on. For example, the output of the language model (e.g., item type 380, requested attribute 382A, requested variant 384A, requested attribute 382B and requested variant 384B) may be used as an input for the priority model to output a priority list of attributes in the search request 310, the priority list may then be used by the matching model 396 as an input along with the search request data 340 to output a plurality of items and their corresponding model variants which may then be used by the swapping model 398 as input along with item data 320 to generate item recommendations 312.

Figure 4:
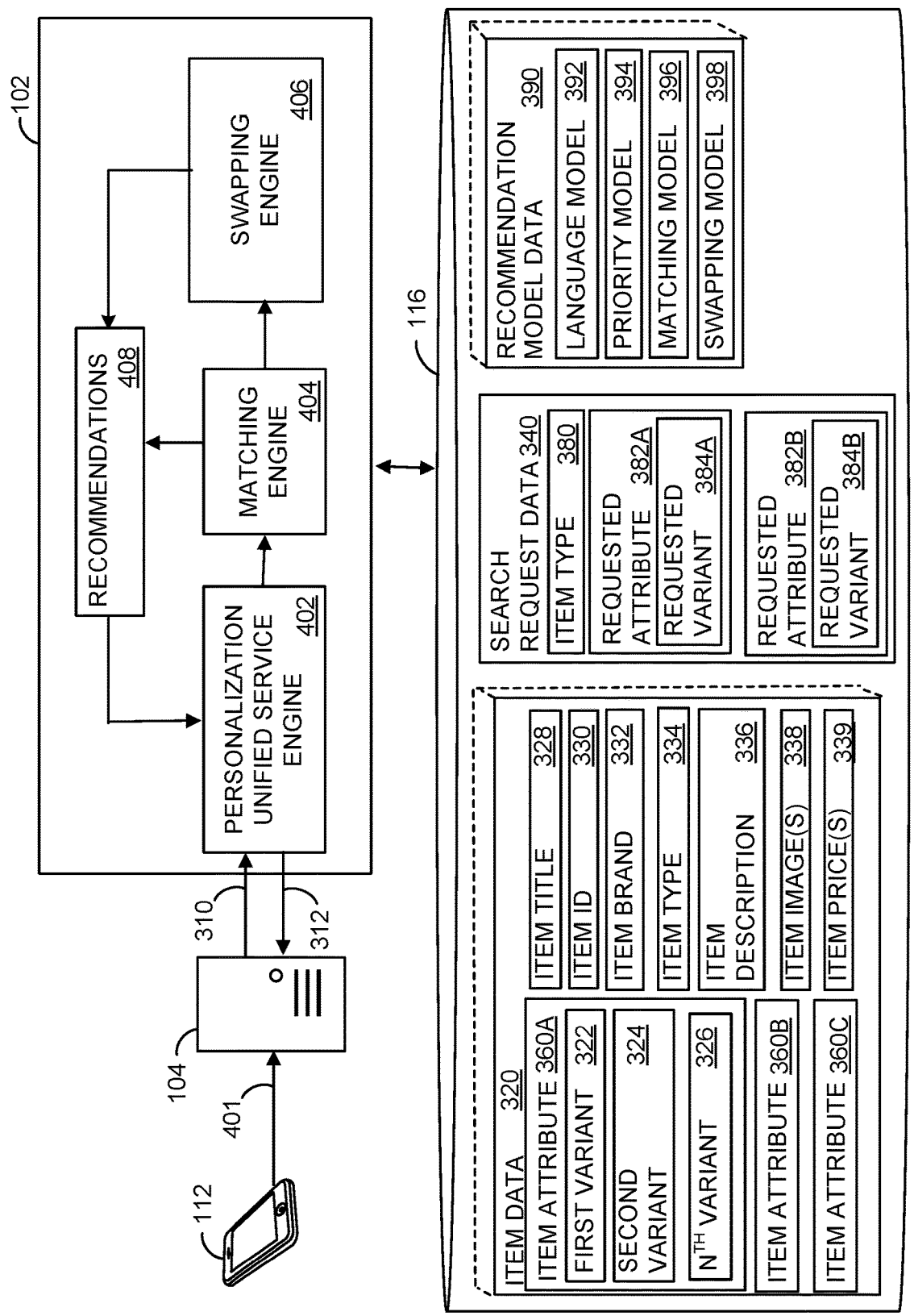
FIG. 4 is a block diagram illustrating various portions of the item recommendation computing device of FIG. 1 in accordance with some embodiments.

FIG. 4 is a block diagram illustrating a more detailed view of item recommendation computing device 102. Specifically, FIG. 4 is a block diagram illustrating a more detailed view of item recommendation computing device 102. Specifically, item recommendation computing device 102 includes personalization unified service engine 402, matching engine 404, and swapping engine 406. In some examples, one or more of personalization unified service engine 402, matching engine 404, and swapping engine 406 are implemented in hardware. In some examples, one or more of personalization unified service engine 402, matching engine 404, and swapping engine 406 are implemented as an executable program maintained in a tangible, non-transitory memory, such as instruction memory 207 of FIG. 2, which may be executed by one or processors, such as processor 201 of FIG. 2. For example, personalization unified service engine 402 may obtain from database 116 search request 310 as message 401 from user device 112 via web server 104 and may execute recommendation model(s) included in the recommendation model data 390 of FIG. 3.

In this example, web server 104 transmits a search request 310 to item recommendation computing device 102. Search request 310 may include a request for item recommendations for presentation to a particular user using the user device 112. In some examples, search request 310 further identifies an item type, an item attribute and an associated requested variant for the item recommendations are requested at web server 104. Personalization unified service engine 402 receives search request 310, and receives and parses the item data 320. Personalization unified service engine 402 provides to the matching engine 404 the search request data 340 in the search request 310, and other data (e.g., item data 320) extracted from database 116.

Matching engine 404 can determine a plurality of items and their corresponding model variant based on the search request data 340 an the item data 320. Matching engine 404 may use matching model 396 to determine from the item data 320 a plurality of items based on the item type 380. For each item in the item data 320, matching engine may find the model variant based on the requested attribute 382A and its corresponding requested variant 384A. In some examples, the matching engine 404 may first match the requested attribute with an attribute associated with the item from the list of attributes (e.g., item attribute 360A, item attribute 360B, item attribute 360C, and so on). For a matched attribute for the item, the matching engine 404 may obtain the list of variants available for the attribute of the item (e.g., first variant 322, second variant 324, . . . , $N^{th}$ variant 326). Matching engine 404 may select, for each item in the plurality of items, a model variant from the corresponding list of variants. Machine engine 404 may provide the item-model variant pairs to the swapping engine 406 to generate recommendations 408.

Swapping engine 406 can determine final recommendations 408 based on user item-model variant pairs corresponding to the plurality of items. Swapping engine 406 may take as input the plurality of items and their corresponding model variants. Swapping engine 406 can determine item recommendations based on swapping at least a portion of item tile 328 associated with an item of the plurality of items with the item's model variant. Each item of the plurality of items may undergo such swapping. In some examples, swapping engine 406 may further determine a model image from item image(S) 338 corresponding to the model variant to be provided alongside the modified item title in the item recommendations 312. In some examples, swapping engine may also modify a price or price range for the item to an item price from item price(s) 339 corresponding to the model variant of the item. Cart aware model engine 406 may also re-rank the first set of ranked items based on the user session data 320 of the current user session and the pre-trained embedding vectors. Swapping model engine 406 may output recommendations 408 including the plurality of items with the modified item titles, item images and/or item prices.

Recommendations 408 can determine an ordered list of the item recommendations 312 based on the outputs received from the swapping engine 406. Recommendations 408 may generate data that identifies the item recommendations 312 associated with the particular search request 312 to optimize user interactions with and user purchases of items in the recommendations.

Personalization unified service engine 402 may receive the item recommendations 312 from the recommendations 408 in a data format (e.g., message) acceptable by web server 104. Personalization unified service engine 402 transmits the item recommendations 312 to web server 104. Web server 104 may then update or generate item recommendations for presentation to the user via the user device 112 based on the final ranking 408.

Figure 5:
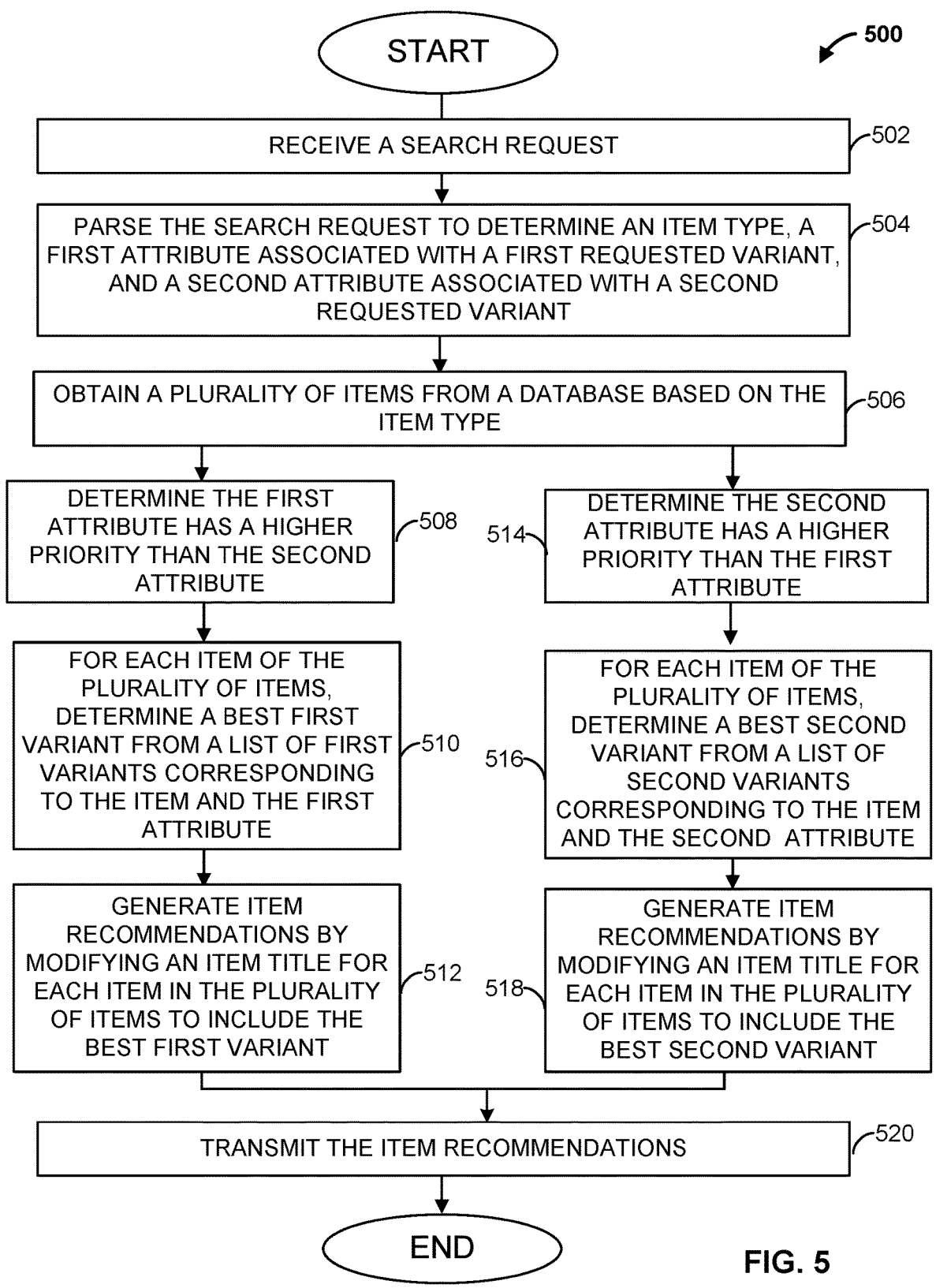
FIG. 5 is a flowchart of an example method that can be carried out by the item recommendation computing device of FIG. 1 in accordance with some embodiments.

FIG. 5 is a flowchart of an example method 500 that can be carried out by a computing device, such as the item recommendation computing device 102 of FIG. 1. Beginning at step 502, a search request is received from a user. For example, item recommendation computing device 102 may receive search request 310 for a user from web server 104. At step 504, the search request is parsed to determine an item type, a first attribute associated with a first requested variant, and a second attribute associated with a second requested variant. For example, item recommendation computing device 102 may parse the search request 312 to determine item type 380, requested attribute 382A, corresponding requested variant 384A, and requested attribute 382B and corresponding requested variant 384B.

At step 506, a plurality of items is obtained from a database based on the item type. For example, item recommendation computing device 102 may obtain a plurality of items from item data 320 based on item type 380 (e.g., by comparing item type 380 to item type 334 for each item sin the item data 320).

The method then proceeds to steps 508 or 514. At step 508, the first attributed is determined to have a higher priority than the second attribute. For example, priority model 394 may generate a priority list of attributes based on the requested attribute 382A and requested attribute 382B, the priority list prioritizing requested attribute 382A over requested attribute 382B. At step 508, the second attributed is determined to have a higher priority than the first attribute. For example, priority model 394 may generate a priority list of attributes based on the requested attribute 382A and requested attribute 382B, the priority list prioritizing requested attribute 382B over requested attribute 382A.

From step 508, the method proceeds to step 510, where a model first variant from a list of first variants is determined corresponding to the item and the first attribute for each item of the plurality of items. For example, for each item of the plurality of items, matching engine 404 may determine a model variant from a list of variants (available of the item) for a requested attribute (e.g., requested attribute 382A) based on the requested variant (e.g., requested variant 384A). At step 512, item recommendations are generated by modifying an item title for each item in the plurality of items to include the model first variant. For example, swapping engine 406 may generate recommendations 408 by modifying at least a portion of the item title 328 for each item of the plurality of items to include the model variant for the item.

From step 514, the method proceeds to step 516, where a model second variant from a list of second variants is determined corresponding to the item and the second attribute for each item of the plurality of items. For example, for each item of the plurality of items, matching engine 404 may determine a model variant from a list of variants (available of the item) for a requested attribute (e.g., requested attribute 382B) based on the requested variant (e.g., requested variant 384B). At step 518, item recommendations are generated by modifying an item title for each item in the plurality of items to include the model second variant. For example, swapping engine 406 may generate recommendations 408 by modifying at least a portion of the item title 328 for each item of the plurality of items to include the model variant for the item.

For steps 512 or 518, the method proceeds to step 520 where the item recommendations are transmitted to the user. For example, item recommendation computing device 102 may transmit the item recommendations 312 to web server 104 for presentation to the user via user device 112. The method then ends.

Figure 6:
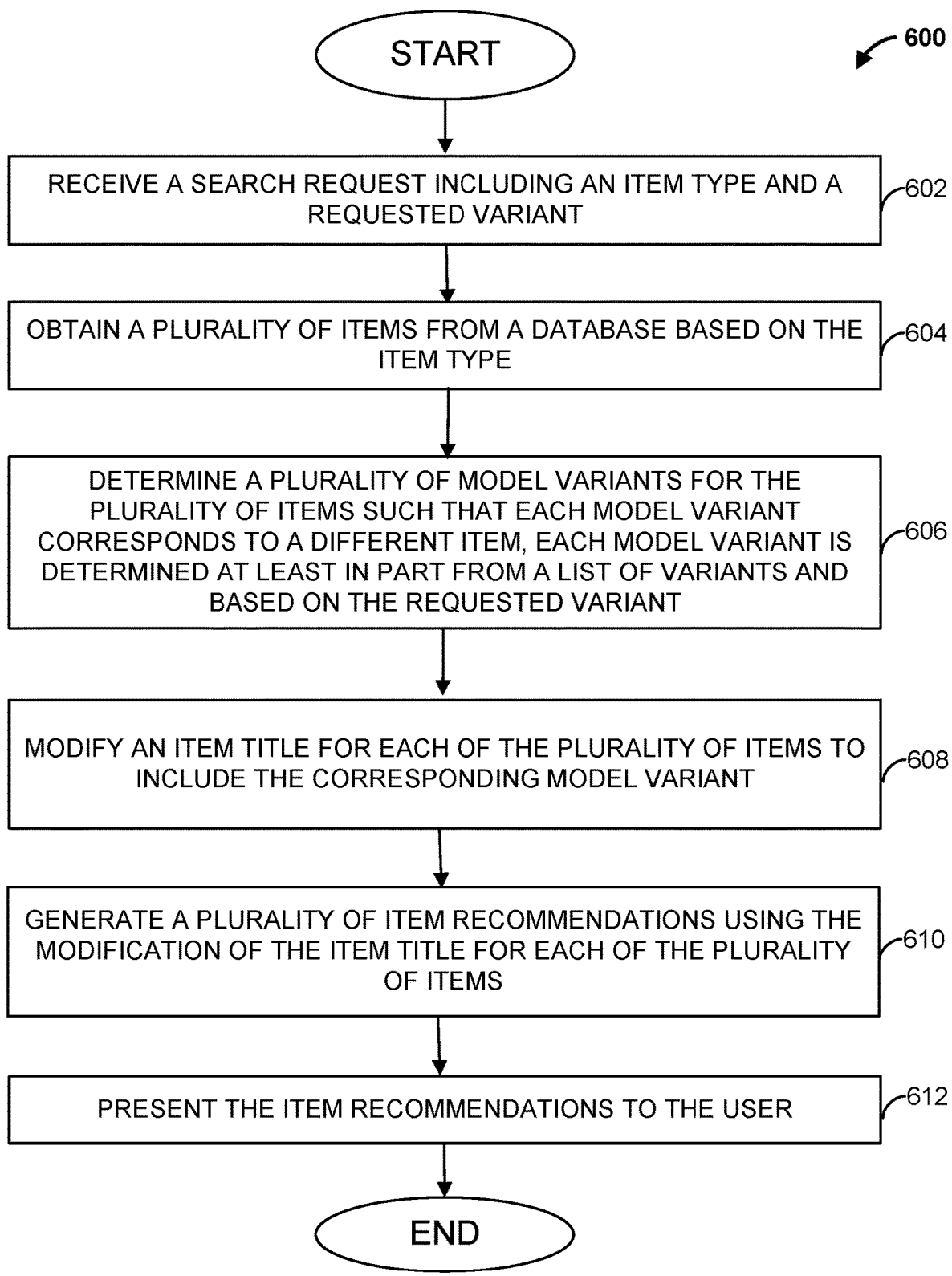
FIG. 6 is a flowchart of another example method that can be carried out by the item recommendation computing device of FIG. 1 in accordance with some embodiments.

FIG. 6 is a flowchart of an example method 600 that can be carried out by a computing device, such as the item recommendation computing device 102 of FIG. 1. Beginning at step 602, a search request including an item type and a requested variant. For example, item recommendation computing device 102 may receive search request 310 including an item type and a requested variant from web server 104. At step 604, a plurality of items are obtained from a database based on the item type. For example, item recommendation computing device 102 may obtain plurality of items corresponding to the item type from database 116, which stores item data related to each item sold by the retailer or in retailer's catalog.

At step 606, a plurality of model variants for the plurality of items are determined such that each model variant corresponds to a different item. Each model variant is determined at least in part from a list of variants and based on the requested variant. For example, matching engine 404 may generate a model variant for each item from a list of variants (stored in database 116) based on the requested variant.

At step 608, an item title for each of the plurality of items is modified to include the corresponding model variant. For example, swapping engine 406 swap a portion of an item title of each item with corresponding model variant. At step 610, a plurality of item recommendations are generated using the modification of the item title for each of the plurality for items. For example, swapping engine 406 may generate recommendations 408 using the modification of the item title for each of the plurality of items.

At step 612, the item recommendations may be presented to the user. For example, item recommendation computing device 102 may transmit the item recommendations 312 to web server 104 for presentation to the user via user device 112. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a memory having instructions stored thereon; and
   a processor coupled to a database, wherein the processor is configured to read the instructions to:
     receive a search request including an item type and a requested variant associated with an item attribute, wherein the search request includes a search query received from a user device;
     search the database to obtain a plurality of items based on the item type;
     generate a plurality of feature vectors based on prior search requests and item data for the obtained plurality of items available in the database, wherein each feature vector of the plurality of feature vectors is associated with at least one item available in the database;
     train a plurality of machine learning models based on the plurality of feature vectors, wherein each machine learning model of the plurality of machine learning models corresponds to at least one feature vector of the plurality of feature vectors, wherein the trained plurality of machine learning models is stored in the database and include at least a trained language model, a trained priority model, a trained matching model, and a trained swapping model;
     determine, via the trained matching model, a plurality of model variants for the plurality of items such that each model variant corresponds to a different item, each model variant is determined at least in part from a list of variants and based on the requested variant, the requested variant includes at least a requested size, length, width, or color for each of the plurality of items;
     generate, via the trained priority model, a priority list of attributes based on the requested attributes from the search request wherein the priority list of attributes has predetermined order;
     receive the priority list of attributes, and for each attribute in the predetermined order, the processor further configured to:
       modify, via the trained swapping model, an item title for each of the plurality of items by swapping at least a portion of the item title with the corresponding model variant associated with the item attribute to generate a modified item title without any input from the user after the search request;
       modify, via the trained swapping model, a price for each of the plurality of items by swapping the price with a price associated with the corresponding model variant associated with the item attribute to generate a modified item price without any input from the user after the search request; and
       modify, via the trained swapping model, a model image from a previous item image corresponding to the model variant associated with the model attribute to generate a modified model image without any user input from the user after the search request;
     isolate a subset of machine learning models from the plurality of machine learning models, the subset of machine learning models corresponding to the plurality of model variants for the plurality of items, the subset of machine learning models including a first machine learning model and a second machine learning model in the database of a computing device;
     generate, via the processor, a plurality of item recommendations based on the first machine learning model and the second machine learning model using the modified item title and the modified item price for each of the plurality of items, an output of the first machine learning model being inputted into the second machine learning model to output the plurality of item recommendations;
     transmit the plurality of item recommendations to a third machine learning model, wherein the third machine learning model is configured to update a rank of the plurality of item recommendations to be displayed to the user based on current user session data which includes at least one of cart information or user interaction; and
     update a display, in response to the search request and via a digital interface on a website or a mobile application accessed by the user, the plurality of ranked item recommendations on a recommendation page to the user, wherein each of the plurality of ranked item recommendations on the recommendation page is presented with the modified item title and the modified item price corresponding to the modified item title.

2. The system of claim 1, wherein the requested variant is one of a one-dimensional variant, two-dimensional variant or a categorical variant.

3. The system of claim 1, wherein the plurality of items include a plurality of variants, and the modified item titles include only the corresponding model variants.

4. The system of claim 1, wherein the search request further includes a second requested variant associated with a second item attribute, and generating the item recommendations further includes modifying the item title for each of the plurality of items to further include a corresponding second model variant associated with the second item attribute.

5. The system of claim 1, wherein the model variant is determined by comparing the requested variant with each variant of the list of variants associated with the corresponding item of the plurality of items.

6. The system of claim 1, wherein generating the item recommendations further includes, for each item, selecting a model item image for display on the digital interface based on the model variant.

7. A method by a processing unit comprising:
   receiving a search request including an item type and a requested variant associated with an item attribute, wherein the search request includes a search query received from a user device;
searching a database to obtain a plurality of items based on the item type;
generating a plurality of feature vectors based on prior search requests and item data for the obtained plurality of items available in the database, wherein each feature vector of the plurality of feature vectors is associated with at least one item available in the database;
training a plurality of machine learning models based on the plurality of feature vectors, wherein each machine learning model of the plurality of machine learning models corresponds to at least one feature vector of the plurality of feature vectors, wherein the trained plurality of machine learning models is stored in the database and include at least a trained language model, a trained priority model, a trained matching model, and a trained swapping model;
determining, via the trained matching model, a plurality of model variants for the plurality of items such that each model variant corresponds to a different item, each model variant is determined at least in part from a list of variants and based on the requested variant, the requested variant includes at least a requested size, length, width, or color for each of the plurality of items;
generate, via the trained priority model, a priority list of attributes based on the requested attributes from the search request wherein the priority list of attributes has predetermined order;
receiving the priority list of attributes, and for each attribute in the predetermined order, the method further including:
    modifying, via the trained swapping model, an item title for each of the plurality of items by swapping at least a portion of the item title with the corresponding model variant associated with the item attribute to generate a modified item title without any input from the user after the search request;
    modifying, via the trained swapping model, a price for each of the plurality of items by swapping the price with a price associated with the corresponding model variant associated with the item attribute to generate a modified item price without any input from the user after the search request; and
    modifying, via the trained swapping model, a model image from a previous item image corresponding to the model variant associated with the model attribute to generate a modified model image without any user input from the user after the search request;
isolating a subset of machine learning models from the plurality of machine learning models, the subset of machine learning models corresponding to the plurality of model variants for the plurality of items, the subset of machine learning models including a first machine learning model and a second machine learning model in the database of a computing device;
generating, a plurality of item recommendations based on the first machine learning model and the second machine learning model using the modified item title and the modified item price for each of the plurality of items, an output of the first machine learning model being inputted into the second machine learning model to output the plurality of item recommendations;
transmitting the plurality of item recommendations to a third machine learning model, wherein the third machine learning model is configured to update a rank of the plurality of item recommendations to be displayed to the user based on current user session data which includes at least one of cart information or user interaction; and
updating a display, in response to the search request and via a digital interface on a website or a mobile application accessed by the user, the plurality of ranked item recommendations on a recommendation page to the user, wherein each of the plurality of ranked item recommendations on the recommendation page is presented with the modified item title and the modified item price corresponding to the modified item title.

8. The method of claim 7, wherein the requested variant is one of a one-dimensional variant, a two-dimensional variant or a categorical variant.

9. The method of claim 7, wherein the plurality of items include a plurality of variants, and the modified item titles include only the corresponding model variants.

10. The method of claim 7, wherein the search request further includes a second requested variant associated with a second item attribute, and generating the item recommendations further includes modifying the item title of each of the plurality of items to further include a corresponding second model variant associated with the second item attribute.

11. The method of claim 7, wherein the model variant is determined by comparing the requested variant with each variant of the list of variants associated with the corresponding item of the plurality of item.

12. The method of claim 7, wherein generating the item recommendations further includes, for each item, selecting a model item image for display on the digital interface based on the model variant.

13. A non-transitory computer readable medium having instructions stored thereon, wherein the instructions, when executed by at least one processor, cause a device to perform operations comprising:
receiving a search request including an item type and a requested variant associated with an item attribute, wherein the search request includes a search query received from a user device;
searching the a database to obtain a plurality of items based on the item type;
generating a plurality of feature vectors based on prior search requests and item data for the obtained plurality of items available in the database, wherein each feature vector of the plurality of feature vectors is associated with at least one item available in the database;
training a plurality of machine learning models based on the plurality of feature vectors, wherein each machine learning model of the plurality of machine learning models corresponds to at least one feature vector of the plurality of feature vectors, wherein the trained plurality of machine learning models is stored in the database and include at least a trained language model, a trained priority model, a trained matching model, and a trained swapping model;
determining, via the trained matching model, a plurality of model variants for the plurality of items such that each model variant corresponds to a different item, each model variant is determined at least in part from a list of variants and based on the requested variant, the requested variant includes at least a requested size, length, width, or color for each of the plurality of items;
generating, via the trained priority model, a priority list of attributes based on the requested attributes from the search request wherein the priority list of attributes has predetermined order;

receiving the priority list of attributes, and for each attribute in the predetermined order. wherein the instructions cause the device to further perform further operations comprising:

modifying, via the trained swapping model, an item title for each of the plurality of items by swapping at least a portion of the item title with the corresponding model variant associated with the item attribute to generate a modified item title without any input from the user after the search request;

modifying, via the trained swapping model, a price for each of the plurality of items by swapping the price with a price associated with the corresponding model variant associated with the item attribute to generate a modified item price without any input from the user after the search request; and modifying, via the trained swapping model, a model image from a previous item image corresponding to the model variant associated with the model attribute to generate a modified model image without any user input from the user after the search request;

isolating a subset of machine learning models from the plurality of machine learning models, the subset of machine learning models corresponding to the plurality of model variants for the plurality of items, the subset of machine learning models including a first machine learning model and a second machine learning model in the database of a computing device;

generating, via the processor, a plurality of item recommendations based on the first machine learning model and the second machine learning model using the modified item title and the modified item price for each of the plurality of items, an output of the first machine learning model being inputted into the second machine learning model to output the plurality of item recommendations;

transmitting the plurality of item recommendations to a third machine learning model, wherein the third machine learning model is configured to update a rank of the plurality of item recommendations to be displayed to the user based on current user session data which includes at least one of cart information or user interaction; and updating a display, in response to the search request and via a digital interface on a website or a mobile application accessed by the user, the plurality of ranked item recommendations on a recommendation page to the user, wherein each of the plurality of ranked item recommendations on the recommendation page is presented with the modified item title and the modified item price corresponding to the modified item title.

14. The non-transitory computer readable medium of claim 13, wherein the requested variant is one of a one-dimensional variant, a two-dimensional variant or a categorical variant.

15. The non-transitory computer readable medium of claim 13, wherein the plurality of items include a plurality of variants, and the modified item titles include only the corresponding model variants.

16. The non-transitory computer readable medium of claim 13, wherein the search request further includes a second requested variant associated with a second item attribute, and generating the item recommendations further includes modifying the item title for each of the plurality of items to further include a corresponding second model variant associated with the second item attribute.

17. The non-transitory computer readable medium of claim 13, wherein the model variant is determined by comparing the requested variant with each variant of the list of variants associated with the corresponding item of the plurality of item.

* * * * *